(Model.)
B. F. GILBERT, Jr.
MOP HOLDER.
No. 378,586. Patented Feb. 28, 1888.
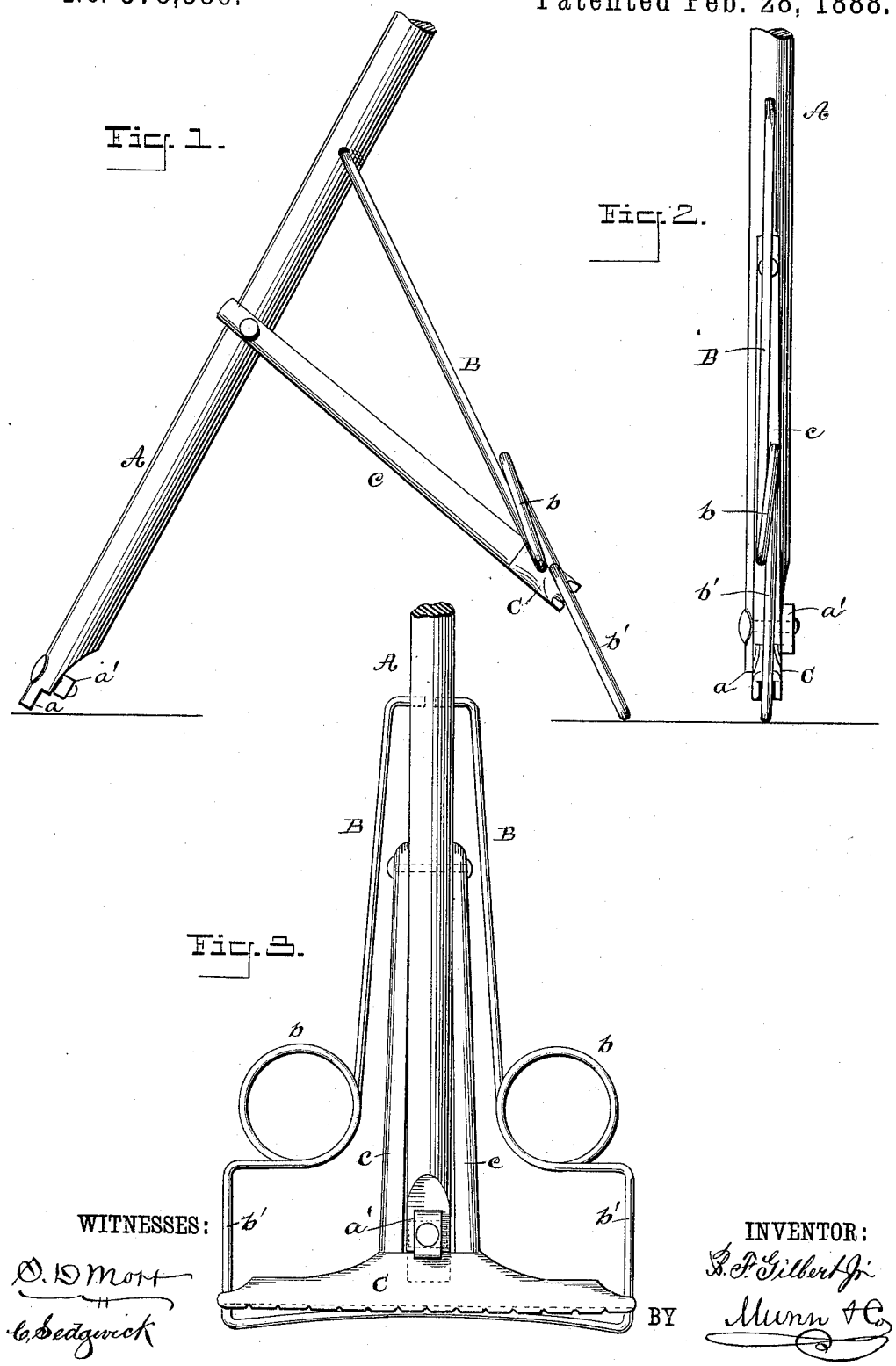

UNITED STATES PATENT OFFICE.

BENJAMIN F. GILBERT, JR., OF FAIR HAVEN, VERMONT.

MOP-HOLDER.

SPECIFICATION forming part of Letters Patent No. 378,586, dated February 28, 1888.

Application filed May 4, 1887. Serial No. 237,077. (Model.)

*To all whom it may concern:*

Be it known that I, BENJAMIN F. GILBERT, Jr., of Fair Haven, in the county of Rutland and State of Vermont, have invented a new and Improved Mop-Holder, of which the following is a full, clear, and exact description.

The invention consists in the means substantially as hereinafter described and claimed.

Reference is to be had to the accompanying drawings, forming a part of this specification, in which similar letters of reference indicate corresponding parts in all the figures.

Figure 1 is a side elevation of my improved mop-holder in the open position. Fig. 2 is a side elevation of the same in closed position; and Fig. 3 is a front view, the holder being shown closed.

Near the bottom of the mop-handle A are pivotally secured the ends of a wire bail or clamp, B, and below or in advance of the pivot-point of the said bail are also pivotally secured the arms $c\ c$ of the clamp-jaw C, the ends of the said jaw being grooved.

The wire bail or clamp B, at a short distance from the end of the handle A, is bent to form the spring-loops $b$, and extends forward to form the guides $b'$, on which the grooved outer ends of the jaw C travel, and across the front of the end of the handle A.

The extreme end of the handle A is rabbeted at $a$, within which rabbet the clamp-jaw C fits when the said jaw and the bail or clamp B are closed, a small catch-block, $a'$, pivoted at said rabbeted end, serving to fasten the clamp-jaw in the closed position. By this construction, when the clamp or bail B and the clamp-jaw C are swung outward, the jaw C, guided by the guides $b'$ of bail B, recedes from the front of said bail and permits of the mop being placed between the said clamp-jaw and bail, whereupon the clamp-jaw and bail are swung inward, the said jaw seats itself in the rabbet $a$ of handle A, at the same time clamping the mop firmly against the bail. When in the closed position, the catch-block is turned to fasten the jaw in place.

To remove the mop, the catch $a'$ is turned and the bail and clamp-jaw swung outward, which causes the said clamp-jaw to release its hold on the mop and permit of the easy removal of the same.

The handle in no way interferes with the insertion and removal of the mop, as when the said handle is stood on end with the holder uppermost and both the bail and clamp-jaw are swung out the arm of the operator may rest on the arms of the clamp-jaw, leaving both hands free to insert and remove the mop. The insertion and removal of the mop are made more easy by the action of the clamp-jaw in advancing and receding from the front of the bail when swung to and from the handle.

The rabbet $a$ and catch-block $a'$ make a very simple and effective fastener for the holder.

Having thus described my invention, what I claim as new, and desire to secure by Letters Patent, is—

1. The combination, with the handle A, of the bail B, pivotally secured thereto, and the clamp-jaw C, also pivotally secured to said handle, the said bail forming a guide for the ends of the said clamp-jaw, substantially as shown and described.

2. The combination, with the handle A, formed with the rabbet $a$ at its end, and provided with a catch-block, $a'$, adjacent to said rabbet, of the bail B, pivotally secured to said handle, and the clamp-jaw C, also pivotally secured to said handle and formed with grooved ends, by which it is guided on bail B, all substantially as shown and described.

BENJAMIN F. GILBERT, JR.

Witnesses:
N. W. BATCHELDER,
E. M. BATCHELDER.